July 14, 1936.  A. G. HILLMAN  2,047,557
PRODUCTION OF CINEMATOGRAPHIC EFFECTS IN COLOR
Original Filed May 25, 1933   4 Sheets-Sheet 1
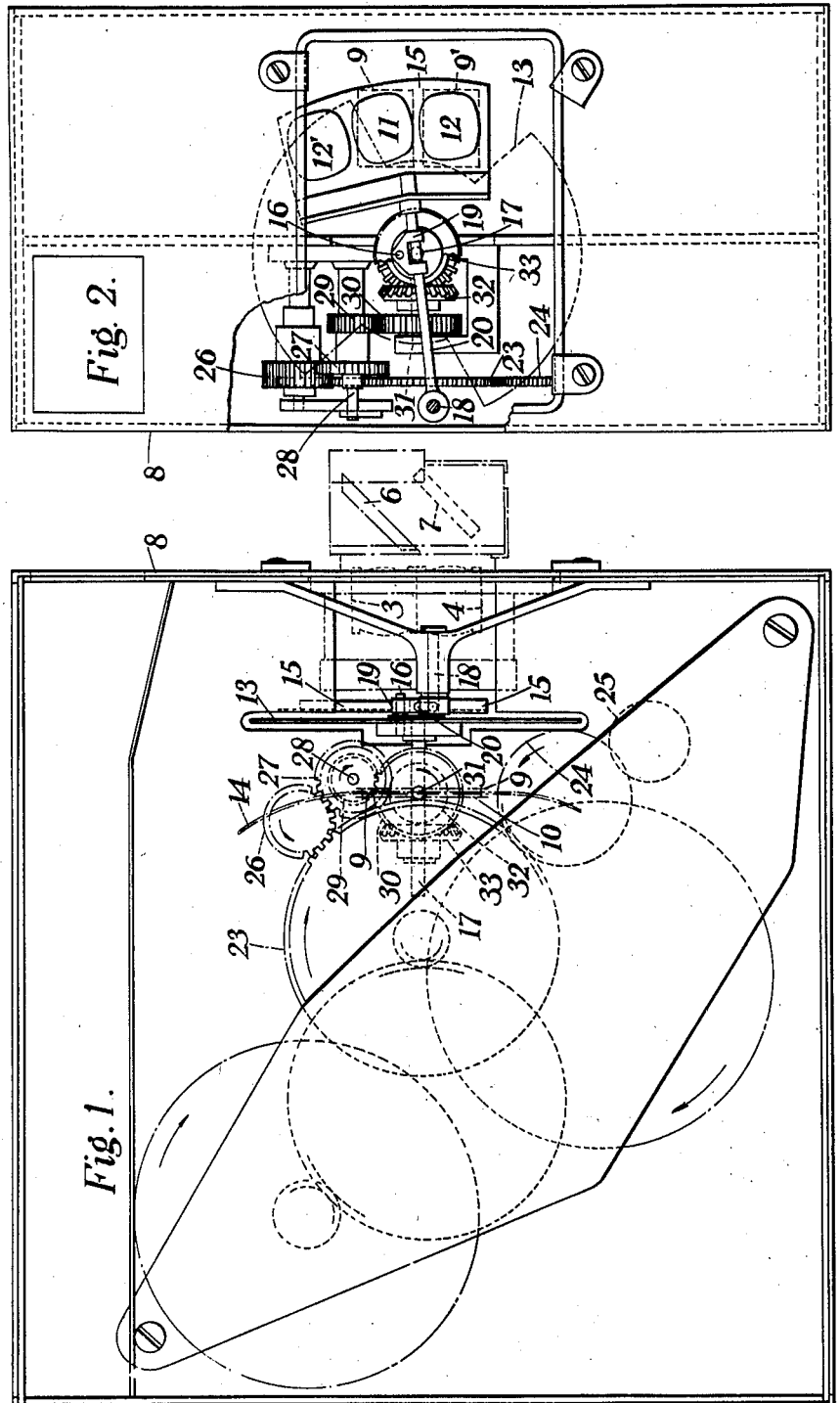
INVENTOR
BY Albert George Hillman
Nathan, Bowman & Helferich
ATTORNEYS July 14, 1936. A. G. HILLMAN 2,047,557
PRODUCTION OF CINEMATOGRAPHIC EFFECTS IN COLOR
Original Filed May 25, 1933 4 Sheets-Sheet 2

INVENTOR
Albert George Hillman
BY
Nathan, Cowman + Helferich
ATTORNEYS

July 14, 1936.  A. G. HILLMAN  2,047,557
PRODUCTION OF CINEMATOGRAPHIC EFFECTS IN COLOR
Original Filed May 25, 1933   4 Sheets-Sheet 3
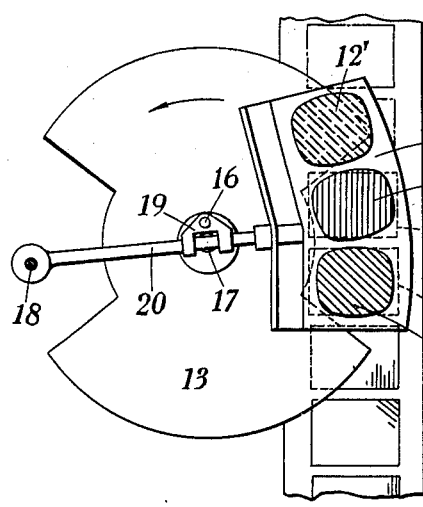
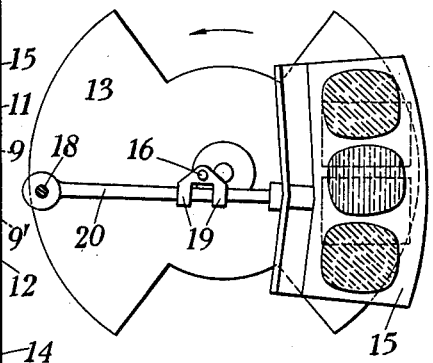
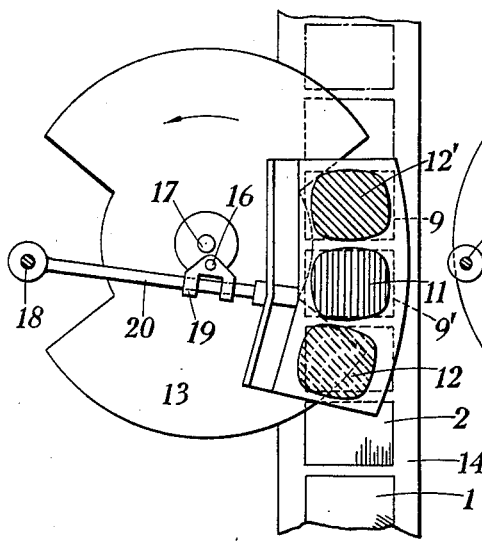
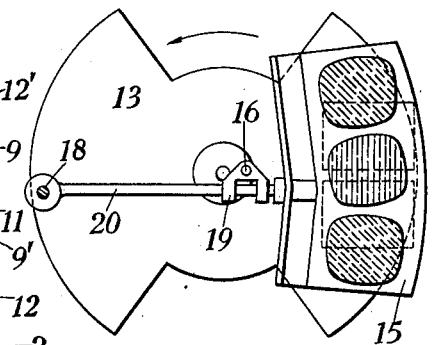
INVENTOR
Albert George Hillman
BY
Nathan, Bowman & Helferich
ATTORNEYS

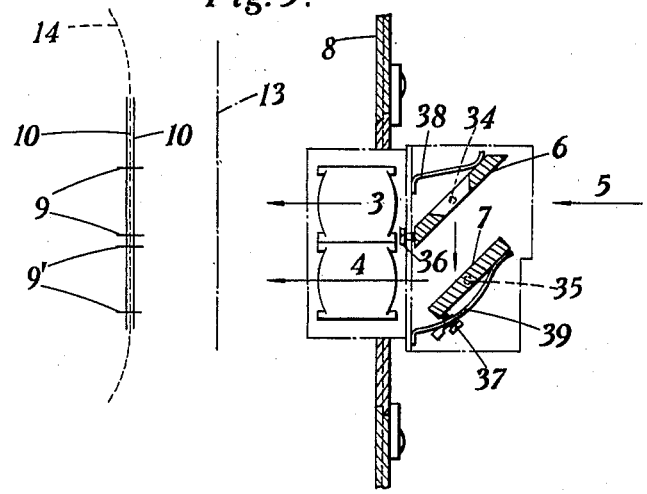
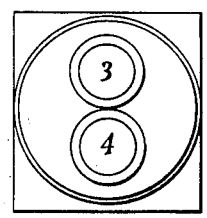
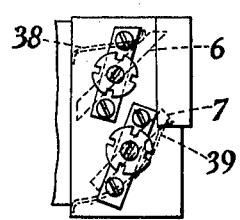
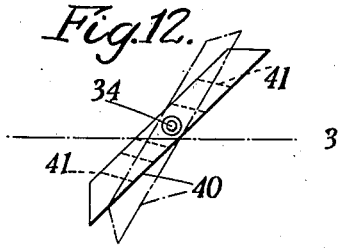
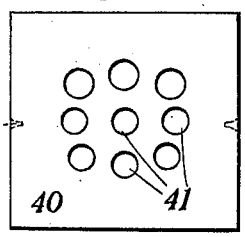
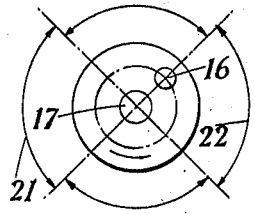

UNITED STATES PATENT OFFICE 2,047,557

PRODUCTION OF CINEMATOGRAPHIC EFFECTS IN COLOR

Albert George Hillman, London, England, assignor to Colourgravure Limited, London, England Original application May 25, 1933, Serial No. 672,862. Divided and this application January 20, 1934, Serial No. 707,431. In Great Britain January 21, 1933

3 Claims. (Cl. 88—16.4)

This invention relates to a method of producing negative bands containing a single series of color constituent images (hereinafter referred to as negatives) which are suitable for producing corresponding positive constituents which may be projected on the screen simultaneously and so give pictures in substantially natural colors by optical synthesis.

The present invention relates to a process for the production on a negative band of color constituent images (negatives) forming a continuous series, in which each negative (except the extreme negatives of the band) is exposed with the preceding negative, and also with the following negative, the exposures in each case being to the same beam which is divided by appropriate means, whereby parallax effects are eliminated, or considerably reduced.

A convenient form of camera for carrying out the process is described in my prior Patent No. 1,983,800 of which this application is a division. Standard width film and standard picture pull can be employed in carrying out said process.

According to such process (when the two color method is employed) negatives of records of different color sensations alternating with each other are photographed by apparatus which may be generally of the usual character for taking cinematographic pictures, but red and green color filters are employed which are brought into position so that a pair of records of two color sensations one after the other along the film is taken from the same aspect through such color filters, the arrangement of the optical system and the color filters being such that during the next exposure period following a shift period in which the film has been advanced an amount corresponding to a single picture pull, that picture of the pair which is the following picture in the direction of motion of the film through the gate, is again exposed with the same aspect through a like color filter to that through which it was first exposed.

Each color sensation record is therefore formed by a double exposure from the same aspect, but constitutes a composite photograph as regards motion analysis, and each pair of successive color sensation records is the result of exposures from the same aspect recording the same motion phase and periodic exposures from the same aspect.

In producing images of moving objects as a result of a first exposure followed, after a cover and shift period, by a further exposure, it is very advantageous that the time interval between exposure and re-exposure should be as short as possible in order that the difference in motion phase exhibited by each color record shall not be such as to obtrude itself to the eye when the positives obtained from the negatives are magnified on to the screen, and the means for attaining this object form another feature of this invention.

The application of a system for producing doubly exposed color records as above described to modern cameras involves the use of a tandem windowed gate in which the windows are exposed successively, for example, by a sectored shutter mounted to rotate about an axis on one side of the gate. The dimensions of a usual window are such that a section of shuttering sector subtending an angle of approximately 18° is required to cover the window, and generally each shutter sector includes a section subtending an angle of 90° during the passage of which across the window the film shift occurs. The speed of a standard half speed shutter is such that the shutter moves through an angle of 20.8° in 1/200 second. Thus after the window has been first covered, the 90° travel of the shutter sector which must take place before the sector commences to open the window again occupies a time interval of somewhat more than 1/50 second.

It is not ordinarily possible to reduce the angle of the opaque shutter sectors to much less than 76° this being accompanied with the use of an accelerated shift mechanism, so that, assuming that the shutter were to rotate in a clockwise direction and the film to move approximately with the shutter in accordance with standard practice, then 36° of angular movement is required to cover the two windows, and the shift of the film ocurs during the next 40° of angular movement, so that the sector must move through slightly more than 76° from the final closing of the window through which the first exposure of each picture area is made and the commencement of the re-exposure of the image then formed in the window below. The angular displacement of 36° during the covering of the two gates involves a time factor of 1/120 second and the 40° covering the shift period occupies 1/108 second.

According to this feature of the present invention the method is such that the individual picture areas are covered successively and the second (or subsequent) exposure of a negative begins before the first exposure of the following negative and this is effected by so mounting the shutter that it will move contrary to the direction of movement of the film and will shutter and expose first that window in which a re-exposure of any picture area takes place.

Thus in using the process in conjunction with a rotary sectored shutter as above described, the time interval between the finish of covering of the window in which the first exposure is made and the commencement of the opening of the window in which the image formed by such first exposure is re-exposed is, with the same speed of shutter, reduced by slightly more than 1/120 second, i. e., equivalent to 36° angular displacement and the additional angular displacement involved by the separation of adjacent pictures. This shortening of the shuttering time factor is clearly of first importance in relation to the particular method of taking with which the invention deals, and becomes an increasing proportion of the normal cover and shift period as the angle subtended by the sector is decreased.

The different motion phases compounded in any one image, are, moreover, the result of half exposures only, and in general for normal or slow motion cinematography, there is little or no subversive effect in color fringing on projection of the positive film, made from the negative taken by this method, on the screen. When there is non-identity of position due to the slightly different motion phase the record is made at but half exposure.

In order that the present invention may be the more readily understood, reference is hereinafter made to the constructional form (which is applicable to a two color process) illustrated in the accompanying drawings, in which:—

Fig. 1 is a side elevation of a camera adapted to take pictures according to the present process, and Fig. 2 is a front view thereof with the panel carrying the optical system removed.

Figs. 5 to 8 show the shutter and the moving filter carrier in four successive positions representing 90° angular displacements of the shutter shaft.

Fig. 9 is a side sectional elevation of the panel carrying the optical system, and Figs. 10 and 11 are rear and side views of the optical system casing.

Figs. 12 and 13 show in side and front elevation respectively a modification of the optical system hereinafter referred to.

Fig. 14 is a diagrammatic view showing a retarded and accelerated motion of the filters.

For carrying the present invention into practical effect the negative film on which the pictures are taken in the camera is of the panchromatic type and I have found that a standard super-sensitive panchromatic film works well for the purpose of the present invention.

As color filters for taking the negative film I have found standard two color taking filters to work well, preference being at present had to a dense red filter not extending into the golden yellow of the spectrum and a green filter such that an image taken through it of a gradated black to white band will be of substantially the same density throughout as a similar image produced through such red filter.

Figure 3:
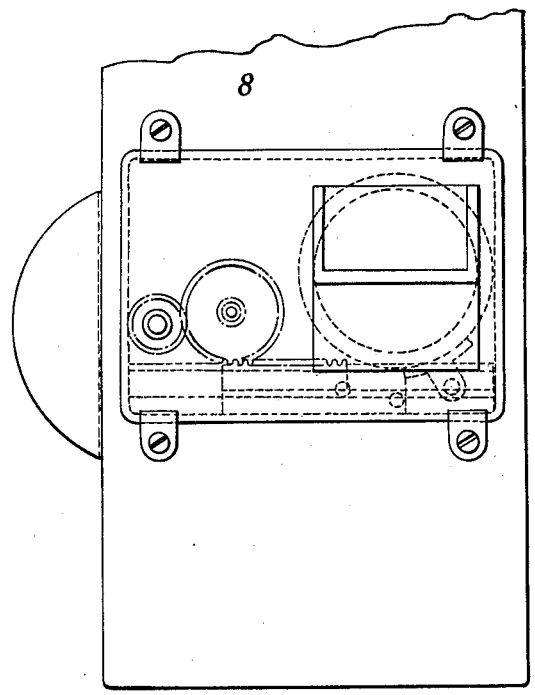
Fig. 3 is a front view with the panel in position.
Figure 4:
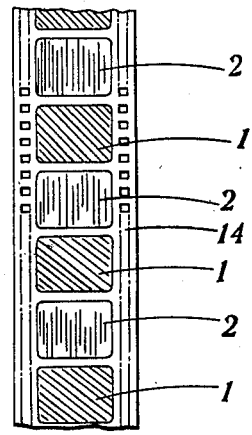
Fig. 4 shows a piece of standard size film which can be used for the negative and positive pictures.

For the purpose of taking each pair or sequence 1, 2, Fig. 4 of the recurring sequences of two color sensations from the same aspect, an optical taking system can be used such as is illustrated in Fig. 9 in which a pair of paired lenses 3, 4 are employed in combination with a light dividing system in which a branch beam is separated from the entering beam of light 5 by reflectors 6, 7, the direct beam passing directly through the medial aperture of reflector 6 and one lens 3 to the focal plane, while the branch beam is reflected by the imperforate reflector 7 to pass through the other lens 4 parallel to the direct beam to the same focal plane.

In the camera 8 a tandem two windowed gate 9, 9' and film track 10 are provided to permit simultaneous exposure to be made through the respective red and green filters 11, 12 (12'), the two paired lenses 3, 4 and the light dividing system 6, 7 providing for the taking of a like picture through each window 9, 9'.

To provide that each picture shall be formed by two exposures, one in each of the two gate-windows 9, 9', the two exposures being separated by a period of time during which the mechanical movements are carried out to make a picture shift after the shutter cover is completed, a diametral sectored opaque shutter 13 serves well which looking at the front of the camera rotates in an anti-clockwise direction so as to provide that the time interval between each exposure shall be considerably shorter than if the shutter were to be rotated in a clockwise direction, because in the former case the direction of the film movement along the track 10 in shifting the picture areas 1, 2 from one gate window 9 to the next 9' is opposed to the direction of rotation of such shutter.

The intermittent mechanism employed may be of the usual character giving the standard picture pull or it may, if desired, give an accelerated picture pull to allow for a shortening of the shutter sectors, so that at the completion of the film shift movement to give a one picture pull, two consecutive picture areas 1, 2 are simultaneously exposed from the same aspect, and when exposure is completed for this picture pull, that exposed area 1 which is the following area in the direction of motion of the film 14 through the gate 9, 9' is transferred, in the next shift movement of the film, to the next gate window 9' for a second exposure, whilst the preceding window 9 provides for giving a first exposure of the next following picture area, the previously double exposed picture passing along the track.

Thus the window 9 in which each picture area is exposed for the first time is shuttered after the window 9', and during the shift period the film is moved down one picture area so that the picture area which has already received one exposure in window 9 is re-exposed in window 9' before the next following picture area receives its first exposure.

The arrangement of the color filters 11, 12 (12') is such that the cycle of operating two exposures of the same picture area includes the interposition of a like color filter for each such exposure, e. g., if the exposure through the first window 9 is made through the red filter 11 (see Fig. 5) the simultaneous exposure through the second window will be made through the green filter 12 and, after the shift period is completed, the second exposure in the second window 9', being as it will be of the red record, must again be made through the red filter 11, and the first window 9 now being required for photographing a green record, will require the interposition of the green filter 12', (see Fig. 7).

This filter shift is synchronized with the picture shift timing of the camera, and for compactness it is convenient to employ an oscillating sector 15 carrying three filters arranged one after the other over substantially the same arc, the middle filter 11 being red and the outside filters 12, 12' being green.

As shown the oscillating motion is imparted to the filter sector 15 by a crank pin drive 16 from a shutter spindle 17 revolving at half the normal speed which in an ordinary black and white camera is one revolution for one picture shift. But this speed of the shutter may if desired be retained in which case the crank pin drive could be derived from a half speed secondary shaft. This oscillating sector 15 is pivotally anchored at one end 18, remote from the filters, to the camera framework, and the crank pin drive 16 is preferably transmitted to such oscillating sector 15 through the medium of a sleeve 19 slidably mounted on a rod 20 by which the sector 15 is pivotally mounted.

During the working of the camera, the filters will be continuously oscillating so that any slight defects in the filters will be smoothed out in the color records.

The crank pin drive 16 provides for an accelerated motion of the filters over two opposing 90° motions 21, 22 of the crank, the end motions being considerably retarded over the other two opposing 90° motions, such retarded motions corresponding to the shutter exposure positions. There being three filters 11, 12 (12') and two gate windows 9, 9', two filters 12, 12' being like in color and separated by another 11 unlike in color, in the example shown two green filters 12, 12' separated by a red filter 11 and carried by the oscillating sector 15 and moving in timed relationship with the picture shift and shutter opening, there is always one filter in the inoperative position when exposure takes place, preceding in one exposure the first exposure window 9 and being at the next exposure in advance of the second exposure window 9'.

Figs. 5 to 8 represent respectively four successive positions of the shutter 13 and the sector 15 produced by successive 90° angular displacements of the rotating shutter spindle, Figs. 5 and 7 showing the position of the parts during exposure after approximately one-half of the retarded movement has been made, and Figs. 6 and 8 the positions during film shifts.

The drive of the rotating shutter shaft 17 and of the claw mechanism for imparting an intermittent movement to the film may be derived from the usual spring motors, the common toothed wheel 23 being geared up to the motors in the usual way. This wheel 23 drives toothed wheels 24, 25 which are related to the claw mechanism in well known manner such mechanism being not shown in the drawings since it forms no part of the present invention. The drive of the shutter shaft 17 from the wheel 23 is through a toothed wheel 26, and another 27 on the shaft 28 which carries a toothed wheel 29 meshing with another wheel 30 on a shaft 31 which carries a bevel wheel 32 engaging with a bevel wheel 33 on the shutter spindle 17.

For adjustment purposes the reflectors 6, 7 are rotatably mounted about axes 34, 35 and are rotated by small amounts by the adjusting screws 36, 37 against springs 38, 39 pressing behind each reflector.

The reflector 6 of the light dividing system depicted in Fig. 9 is provided with a single central aperture, but if desired, to permit the system to operate over a greater range of stops and to minimize parallax a reflector 40, see Figs. 12 and 13 may be employed provided with multiple perforations 41 the axes of which may be inclined in one direction to favor one half of the picture area and the walls of which may be locally relieved or diminished through the thickness of the material to the reflecting face in another direction to favor the other half and thereby facilitate the passage of inclined rays and the effective illumination of the marginal portions of the picture area as described and claimed in the co-pending application No. 672,862 dated May 25, 1933 made by the present applicant. In order that the axes of the holes may be inclined to the optical axis the mirror is rotated slightly from the position it is to occupy in use (see the full line position (Fig. 12)) to the dotted line position, the drilling tool being horizontal.

Cinematographic cameras of the character in general use do not provide sufficient space to run a rotating filter of the disc type having concentric colored bands, and consequently oscillating mechanism of the character above described enables the present invention to be readily adapted to present day cameras. The oscillating principle further favorably reduces friction troubles and eliminates the slide guides which a rectilinear reciprocating motion would require, but the present invention (in its broad aspect) is however not to be regarded as limited to any particular method of interposing the color filters at the proper time.

This double exposure of each color record provides for features and characteristics unobtainable in single exposure records. In most color processes large aperture lenses which involve short depth and light density color filters have been the rule to secure enough light for an exposure, making the conditions for even transmission of the light filters difficult if not impossible, special optical light dividing means being resorted to to divide the light in proportion to the requirements demanded by the light filter factors.

The double exposure provided by the present invention enables the process according to the present invention to operate with those dense filters which give a desirable even light transmission for each color, providing better separation records, and enabling small aperture lenses to be employed with considerably increased depth to the focus, while the 24 picture speed now necessitated for the taking of sound films can also be readily accommodated.

Double exposure of each color record demands a careful setting of the light dividing system to ensure that registration and size of image are as near perfect as possible, but, since each record receives the full light from each of the emergent divided rays, optical corrections previously necessitated for realizing even exposure at the individual windows can be ignored, inequalities if any in the direct and branch beams substantially compensating each other.

The design and construction of the light dividing system will vary according to the lens focus used. In the case of a short focus lens it is advisable to use a before lens dividing system since the back focus of the lens will not permit the use of a light dividing system between the lens and the focal plane.

A camera substantially as above described will produce an alternating monochrome rendering of color selections on standard film from which a direct positive can be printed in the usual manner.

The respective color records may be identified automatically by the methods described in my prior Patent No. 1,983,800.

From the negative film made according to my process a monotone positive transparency can be made by any usual or convenient method. In projecting such film each positive (except the extreme positives) is projected twice, once with the preceding and once with the succeeding positive, appropriate color filters being interposed at each projection, and such projection may be effected by any known or convenient method.

Preferably from the negative obtained as hereinabove described, a monotone positive transparency film is made for use in the cinematograph projecting apparatus which may be of the standard type except that provision is made for interchanging the standard lens with a pair of lenses having appropriate adjustment for accurately superposing the alternating color sensations on the sheet, and for interposing the appropriate color filters in the path of the beams, the successive projection of each color sensation as it passes through the gate being arranged to be made through its corresponding color filter in a like or similar way to that which governs the double exposure in the camera through the same or like color filters.

Standard two color projecting filters will serve well in projection, preference being at present had to a dense red filter and a blue-green filter such that a beam projected through it and superposed on a white screen on a beam projected through such red filter will produce white. The green filter will vary according to the nature of the source of light used in the projecting apparatus, the selected filter being however one which is as dense a green as possible consistent with producing white when projected on the beam through the dense red filter.

It is found that in general no objectionable color fringing steps in the case of normally active moving subjects when employing a 2" focus lens, but for close up subjects the expedient may be adopted of employing a turret arrangement on the camera by which a lens of longer focal length can be readily substituted for dealing with close up subjects.

Although I have hereinbefore spoken of a two color process for the production of cinematographic effects in color which is preferred, the present specification and the claims hereof are to be regarded as including cases in which the choice may fall on the employment of a three color process in which case each color constituent image may be arranged to be re-exposed either once or twice through the same or a like color filter.

In a variant way of producing cinematographic effects in color from a negative band obtained under the present invention, a positive band may be produced therefrom, in which each picture is a complete heliochrome, such heliochrome reconstitution from the negative band being made by any selective printing process in which the color analysis elements are mechanically selected from the negative band and the positive prints thus selected brought to correct colors.

The extreme picture frames of the band will ordinarily not be given the same plurality of exposures as the rest of the picture frames, and when reference is made in the claims which follow to each picture frame being so exposed, these extreme picture frames are ignored.

What I claim is:—

1. A process for the production on a negative band of color constituent images forming one continuous series which comprises optically dividing an image bearing beam into two image bearing beams from the same view point, filtering the image bearing beams to provide complementary color images, exposing a pair of picture frames to the colored images, then shifting the film one picture frame, then dividing a second image bearing beam into two image bearing beams from the same view point, filtering the last mentioned image bearing beams to provide complementary colored images, and exposing one of the previously exposed picture frames to a like colored image of said last mentioned image bearing beams and a new picture frame to the other colored image.

2. A method as set forth in the preceding claim in which the second exposure comprises first beginning the exposure of the exposed picture frame and then beginning the first exposure of the new picture frame.

3. A process for the production on a negative band of color constituent images forming one continuous series, which consists in dividing an image bearing beam into a number of image bearing beams from the same view point, filtering the respective image bearing beams to provide a number of colored image bearing beams, exposing a picture frame to each of said colored image bearing beams, then shifting the film band one picture frame, then dividing a second image bearing beam into a number of image bearing beams from the same point of view, filtering said last mentioned image bearing beams to provide a number of complementary colored image bearing beams, and exposing at least one of the previously exposed picture frames to a like colored image bearing beam of the last mentioned number of colored image bearing beams and a new picture frame for the first time to another of the last mentioned colored image bearing beams so that each picture frame is given an exposure to an image bearing beam the same as the exposure given to the preceding picture frame and the exposure given to the following picture frame.

ALBERT GEORGE HILLMAN.